United States Patent
Kamilov et al.

(10) Patent No.: US 10,148,873 B2
(45) Date of Patent: Dec. 4, 2018

(54) METHOD AND SYSTEM FOR MOTION ADAPTIVE FUSION OF OPTICAL IMAGES AND DEPTH MAPS ACQUIRED BY CAMERAS AND DEPTH SENSORS

(71) Applicant: Mitsubishi Electric Research Laboratories, Inc., Cambridge, MA (US)

(72) Inventors: Ulugbek Kamilov, Cambridge, MA (US); Petros T Boufounos, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 309 days.

(21) Appl. No.: 14/978,202

(22) Filed: Dec. 22, 2015

(65) Prior Publication Data
US 2017/0180639 A1    Jun. 22, 2017

(51) Int. Cl.
H04N 5/232    (2006.01)
G01S 17/08    (2006.01)
(Continued)

(52) U.S. Cl.
CPC ........... *H04N 5/23232* (2013.01); *G01C 3/08* (2013.01); *G01S 17/08* (2013.01); *G06K 9/6215* (2013.01);
(Continued)

(58) Field of Classification Search
CPC ...... H04N 5/23232; G01C 3/08; G01S 17/08; G06K 9/6215; G06K 9/6267;
(Continued)

(56) References Cited

U.S. PATENT DOCUMENTS 6,487,304 B1 * 11/2002 Szeliski .................. G06K 9/20
382/107
7,889,949 B2    2/2011 Cohen et al.
(Continued)

FOREIGN PATENT DOCUMENTS

WO    0077734 A2    12/2000

OTHER PUBLICATIONS

Kamilov et al. "Depth superresolution using motion adaptive regularization." International Conference on Multimedia and Expo workshowsm IEEE. Jul. 11, 2016. pp. 1-6.
(Continued)

*Primary Examiner* — Christopher S Kelley
*Assistant Examiner* — Matthew K Kwan
(74) *Attorney, Agent, or Firm* — Gene Vinokur; James McAleenan; Hironori Tsukamoto

(57) ABSTRACT

A method and system for fusing sensed measurements includes a depth sensor to acquire depth measurements of a scene as a sequence of frames, and a camera configured to acquire intensity measurements of the scene as a sequence of images, wherein a resolution of the depth sensor is less than a resolution of the camera. A processor searches for similar patches in multiple temporally adjacent frames of the depth measurements, groups the similar patches into blocks using the intensity measurements, increases a resolution of the blocks using prior constraints to obtain increased resolution blocks, and then constructs a depth image with a resolution greater than the resolution of sensor from the increased resolution blocks.

24 Claims, 3 Drawing Sheets

(51) Int. Cl.
| | |
|---|---|
| *G06K 9/62* | (2006.01) |
| *G01C 3/08* | (2006.01) |
| *G06T 7/00* | (2017.01) |
| *G06T 3/40* | (2006.01) |

(52) U.S. Cl.
CPC .......... *G06K 9/6267* (2013.01); *G06T 3/4053* (2013.01); *G06T 7/0051* (2013.01); *G06T 7/0081* (2013.01); *G06T 2207/20021* (2013.01)

(58) Field of Classification Search
CPC ... G06T 3/4053; G06T 7/0051; G06T 7/0081; G06T 2207/20021
USPC ........................................................ 348/135
See application file for complete search history.

(56) References Cited

U.S. PATENT DOCUMENTS

| | | | | |
|---|---|---|---|---|
| 8,355,565 | B1* | 1/2013 | Yang | G06T 7/593 382/154 |
| 2008/0260261 | A1* | 10/2008 | Li | G06K 9/4609 382/209 |
| 2012/0269458 | A1* | 10/2012 | Graziosi | H04N 19/597 382/299 |
| 2013/0010067 | A1 | 1/2013 | Veeraghavan et al. | |
| 2013/0221961 | A1* | 8/2013 | Liu | G01R 33/56545 324/307 |
| 2015/0023563 | A1 | 1/2015 | Koppal | |
| 2015/0042844 | A1* | 2/2015 | Shu | H04N 9/735 348/224.1 |
| 2015/0172623 | A1* | 6/2015 | Wu | H04N 13/0011 348/43 |
| 2015/0193910 | A1 | 7/2015 | Tuzel et al. | |

OTHER PUBLICATIONS

Pascal et al. "Interaction of visual prior constraints," Vision Research., vol. 41, No. 20. Sep. 1, 2001. pp. 2653-2668.

J. Diebel and S. Thrun. An application of markov random field to range sensing. In Proc. Advances in Neural Information Processing Systems 18, vol. 18, pp. 291-298, Vancouver, BC, Canada, Dec. 5-8, 2005.

J. Dolson, J. Baek, C. Plagemann, and S. Thrun. Upsampling range data in dynamic environments. In Proc. IEEE CVPR, vol. 23, pp. 1141-1148, San Francisco, CA, USA, Jun. 13-18, 2010.

D. Ferstl, C. Reinbacher, R. Ranftl, M. Ruether, and H. Bischof. Image guided depth upsampling using anisotropic total generalized variation. In Proc. IEEE Int. Conf. Comp. Vis., pp. 993-1000, Sydney, NSW, Australia, Dec. 1-8, 2013.

X. Gong, J. Ren, B. Lai, C. Yan, and H. Qian. Guided depth upsampling via a cosparse analysis model. In Proc. IEEE CVPR WKSHP, pp. 738-745, Columbus, OH, USA, Jun. 23-28, 2014.

W. Huang, X. Gong, and M. Y. Yang. Joint object segmentation and depth upsampling. IEEE Signal Process. Lett., 22(2):192-196, Feb. 2015.

Jesse Levinson and Sebastian Thrun., "Automatic Online Calibration of Cameras and Lasers," Robotics: Science and Systems (RSS), 2013.

Y. Li, T. Xue, L. Sun, and J. Liu. Joint example-based depth map super-resolution. In Proc. IEEE Int. Con. Multi., pp. 152-157, Melbourne, VIC, Australia, Jul. 9-13, 2012.

M.-Y. Liu, O. Tuzel, and Y. Taguchi. Joint geodesic upsampling of depth images. In Proc. IEEE CVPR, pp. 169-176, Portland, OR, USA, Jun. 23-28, 2013.

S. Lu, X. Ren, and F. Liu. Depth enhancement via low-rank matrix completion. In Proc. IEEE CVPR, pp. 3390-3397, Columbus, OH, USA, Jun. 23-28, 2014.

J. Park, H. Kim, Y.-W. Tai, M. S. Brown, and I. Kweon. High quality depth map upsampling for 3D-TOF cameras. In Proc. IEEE Int. Conf. Comp. Vis., pp. 1623-1630, Barcelona, Spain, Nov. 6-13, 2011.

Williams et al. "Automatic Image Alignment for 3D Environment Modeling," In Proceedings of the 17th Brazilian Symposium on Computer Graphics and Image Processing, 2004. IEEE.

Z. Yang and M. Jacob. Nonlocal regularization of inverse problems: A unified variational framework. IEEE Trans. Image Process., 22(8):3192-3203, Aug. 2013.

* cited by examiner

METHOD AND SYSTEM FOR MOTION ADAPTIVE FUSION OF OPTICAL IMAGES AND DEPTH MAPS ACQUIRED BY CAMERAS AND DEPTH SENSORS

FIELD OF THE INVENTION

This invention relates to sensing systems and methods, and more specifically to fusing sensed measurements output by low-resolution depth sensors and a high-resolution optical cameras.

BACKGROUND OF THE INVENTION

One of the important challenges in computer vision applications is acquiring high resolution depth maps of scenes. A number of common tasks, such as object reconstruction, robotic navigation, and automotive driver assistance can be significantly improved by complementing intensity data from optical cameras with high resolution depth maps. However, with current sensor technology, direct acquisition of high-resolution depth maps is very expensive.

The cost and limited availability of such sensors imposes significant constraints on the capabilities of computer vision systems and hinders the adoption of methods that rely on high-resolution depth maps. Thus, a number of methods provide numerical alternatives to increase the spatial resolution of the measured depth data.

One of the most popular and widely used class of techniques for improving the spatial resolution of depth data is guided depth superresolution. Those techniques jointly acquire depth maps of the scene using a low-resolution depth sensor, and optical images using a high-resolution optical camera. The data acquired by the camera is subsequently used to superresolve a low-resolution depth map. Those techniques exploit the property that both modalities share common features, such as edges and joint texture changes. Thus, such features in the optical camera data provide information and guidance that significantly enhances the superresolved depth map.

In the past, most of those methods operated on a single optical image and low-resolution depth map. However, for most practical uses of such methods and systems, one usually acquires a video with the optical camera and a sequence of snapshots of the depth maps.

One approach models the co-occurence of edges in depth and intensity with Markov Random Fields (MRF). An alternative approach is based on joint bilaterial filtering, where intensity is used to set weights of a filter. The bilaterial filtering can be refined by incorporating local statistics of depths. In another approach, geodesic distances are used for determining the weights. That approach can be extended to dynamic sequences to compensate for different data rates in the depth and intensity sensors. A guided image filtering approach can further improve edge preservation.

More recently, sparsity-promoting regularization, which is an essential component of compressive sensing, has provided more dramatic improvements in the quality of depth superresolution. For example, improvements have been demonstrated by combining dictionary learning and sparse coding methods. Another method relies on weighted total generalized variation (TGV) regularization for imposing a piecewise polynomial structure on depth.

The conventional MRF approach can be combined with an additional term promoting transform domain sparsity of the depth in an analysis form. One method uses the MRF model to jointly segment objects and recover a higher quality depth. Depth superresolution can be performed by taking several snapshots of a static scene from slightly displaced viewpoints and merging the measurements using sparsity of the weighted gradient of the depth.

Many natural images contain repetitions of similar patterns and textures. State-the-art image denoising methods, such as nonlocal means (NLM), and block matching and 3D filtering (BM3D) take advantage of this redundancy by processing the image as a structured collection of patches. The formulation of NLM can be extended to more general inverse problems using specific NLM regularizers. Similarly, a variational approach can be used for general BM3D-based image reconstruction. In the context of guided depth superresolution, NLM has been used for reducing the amount of noise in the estimated depth. Another method combines a block-matching procedure with low-rank constraints for enhancing the resolution of a single depth image.

SUMMARY OF THE INVENTION

The spatial resolution of depth sensors is often significantly lower compared to that of conventional optical cameras. The embodiments of the invention improve the resolution of depth images using higher resolution optical intensity images as side information. More specifically, the embodiments fuse sensor measurement output by low-resolution depth sensors and high-resolution optical cameras.

Incorporating temporal information in videos can significantly improve the results. In particular, the embodiments improve depth resolution, exploiting space-time redundant features in the depth and intensity images using motion-adaptive low-rank regularization. Results confirm that the embodiments can substantially improve the quality of the estimated high-resolution depth image. This approach can be a first component in methods and systems using vision techniques that rely on high resolution depth information.

A key insight of the invention is based on the realization that information about one particular frame of depth measurements is replicated, in some form, in temporally adjacent frames. Thus, frames across time can be exploited to superresolve the depth map. One challenge is determining this information in the presence of scene, camera, and object motion between multiple temporally adjacent frames.

Another challenge in incorporating time into depth estimation is that depths can change significantly between frames. This results in abrupt variations in depth values along the temporal dimension and can lead to significant degradation in the quality of the result. Thus, it is important to compensate for motion during estimation.

To that end, the embodiments exploits space-time similarities in the measurements using motion adaptive regularization. Specifically, the method searches for similar depth patches that are grouped into blocks, and the blocks are superresolved and regularized using as a prior constraint a rank penalty.

DETAILED DESCRIPTION OF THE PREFERRED EMBODIMENTS

Figure 1:
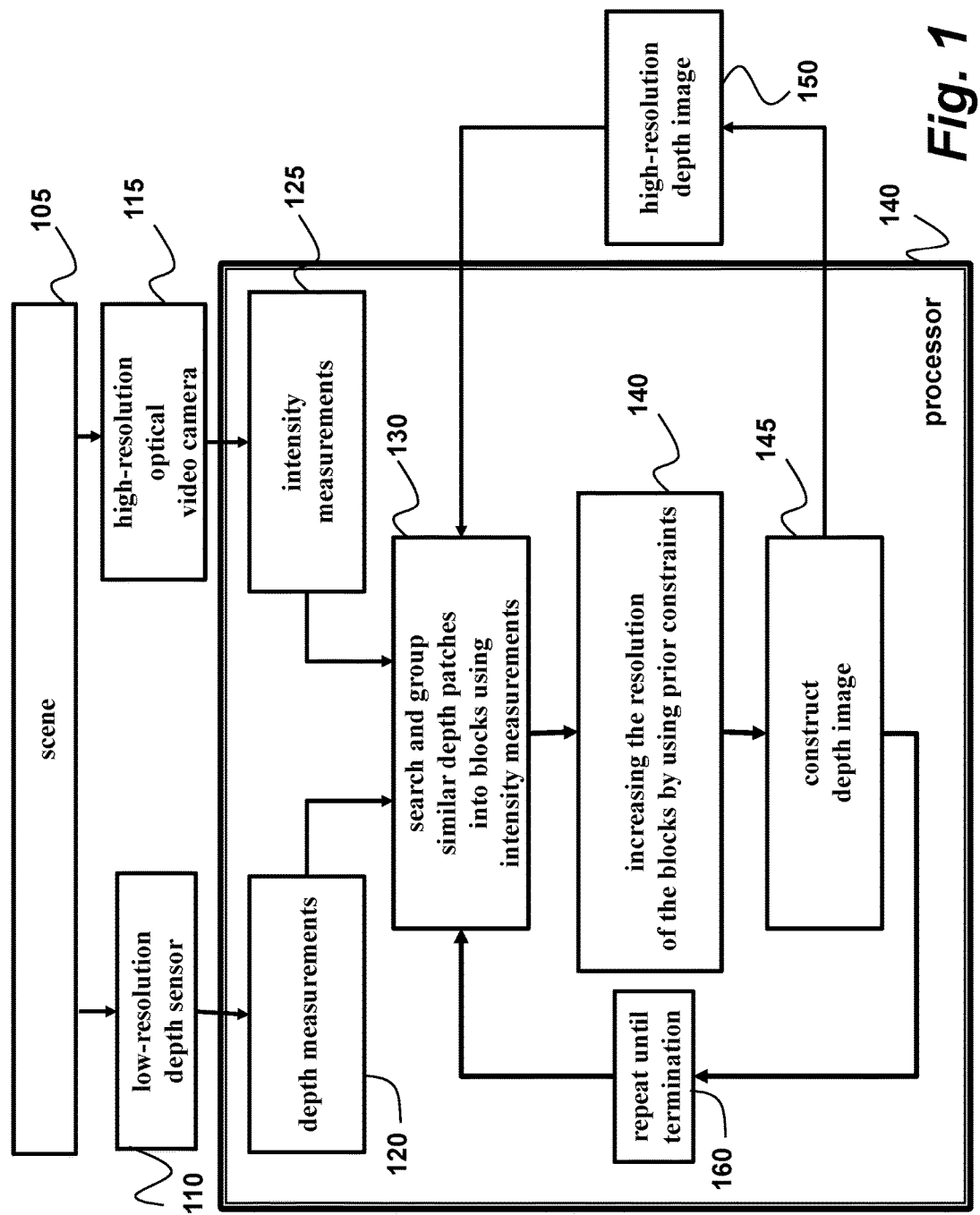
FIG. 1 is a block diagram of a method and system for fusing sensed measurements according to embodiments of the invention.

As shown in FIG. 1, the embodiments of our invention fuse measurement output by low-resolution depth sensors and a high-resolution optical cameras to improve the resolution of a depth image.

The embodiments construct a high-resolution depth image by minimizing a cost function that combines a data-fidelity term and a regularizer. Specifically, we impose a quadratic data fidelity term that controls the error between the measured and estimated depth values. The regularizer groups similar depth patches from multiple frames and penalizes the rank of the resulting depth image.

Because we use patches from multiple frames, our method is implicitly motion adaptive. Thus, by effectively combining measurements from multiple views of the scene, depth estimates are improved.

Method and System Overview

Depth measurements 120 are acquired of a scene 105 with a depth sensor 110, e.g., the depth sensor can be a light radar (LIDAR) sensor. In addition, intensity measurements 125 are acquired of the scene 105 with a camera 115, e.g., the camera is a high-resolution optical video camera. A resolution of the depth sensor is less than a resolution of the camera sensor. The sensor and the camera are calibrated.

In computerized steps, the depth measurements are searched for similar patches, which are then grouped 130 into blocks using the intensity measurements. A search for the similar patches is performed in multiple temporally adjacent frames of the depth measurements. The details of the searching and grouping are detailed below with reference to FIG. 2.

A resolution of the blocks is increased 140 by using prior constraints to produce increased resolution blocks. Then, the increased resolution blocks are used to construct a 145 a high-resolution image 150. That is, the resolution of the depth image is greater than the resolution of depth sensor. The computerized steps are repeated until a termination condition is reached, e.g., a predetermined number of times, convergence on the resolution, or the end of the measurements.

Problem Formulation

Our method and system acquires the depth measurements $\{\psi_t\}_{t\in[1,\ldots,T]}$ of the scene. Each measurement is considered as a downsampled version of a higher resolution depth image $\phi_t \in \mathbb{R}^N$ using a subsampling operator $H_t$. Our end goal is to recover and construct the high-resolution depth image $\phi_t$ for all t, where t are temporal indices to the frames of the depth measurements.

In this description of the embodiments, we use N to denote the number of pixels in each frame, T to denote the number of temporal frames, and M to denote the total number of depth measurements. Furthermore, $\psi \in \mathbb{R}^M$ denotes a vector of all the measurements, $\phi \in \mathbb{R}^{NT}$ denotes the complete sequence of high-resolution depth maps, and $H \in \mathbb{R}^{M \times NT}$ denotes the complete subsampling operator.

We also acquire the intensity measurements 125 as a sequence of high-resolution intensity images $x \in \mathbb{R}^{NT}$ using the camera.

Using the depth measurements and intensity measurement, a forward model for the depth recovery problem is $$\psi = H\phi + e, \quad (1)$$

where $e \in \mathbb{R}^M$ denotes measurement noise. Thus, our objective is to recover and construct the high-resolution depth image 150 given the measurements $\psi$ and x, and the sampling operator H.

We formulate the depth estimation task as an optimization problem $$\hat{\phi} = \underset{\phi \in \mathbb{R}^{NT}}{\operatorname{argmin}} \left\{ \frac{1}{2} \|\psi - H\phi\|_{l_2}^2 + \sum_{p=1}^{P} \mathcal{R}(B_p \phi) \right\}, \quad (2)$$

where $\frac{1}{2}\|\psi - H\phi\|_{l_2}^2$ enforces data fidelity and $\sum_{p=1}^{P} \mathcal{R}(B_p \phi)$ is a regularization term that imposes prior constraints on the depth measurements.

We form the regularization term by constructing sets of patches from each frame in the depth measurements. Specifically, we first define an operator $B_p$, for each set of patches $p \in [1, \ldots, P]$, where P is the number of such sets constructed. The operator extracts L patches of size B pixels from the frames in the depth measurements $\phi$.

Figure 2:
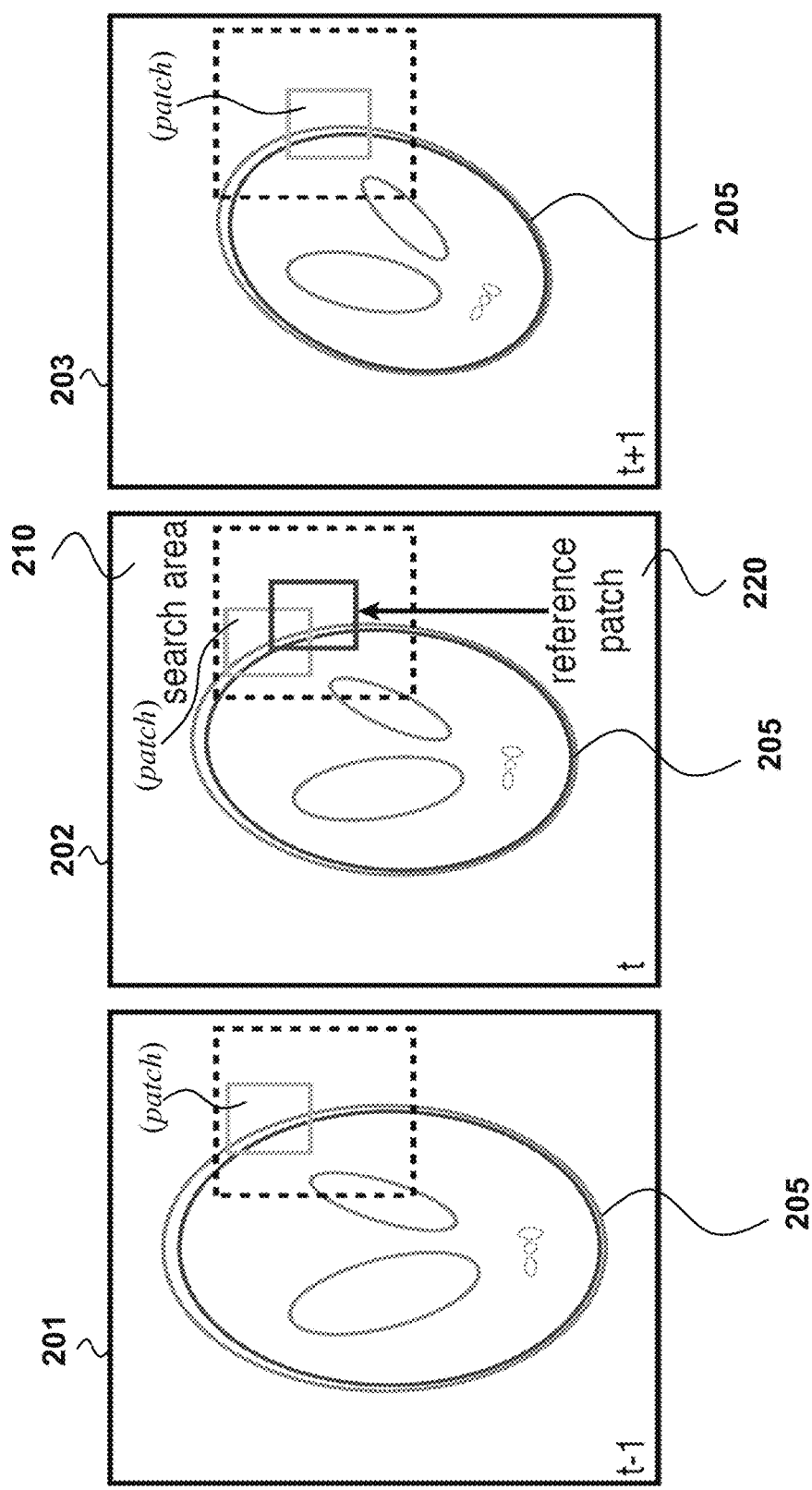
FIG. 2 is a schematic of block searching and grouping within a space-time search area according to embodiments of the invention.

FIG. 2 shows the block searching and grouping within a space-time search area 210. The figure shows frames 201, 202 and 203 respectively at times t−1, t and t+1. The frames include various features 205.

The search area in the current frame t is centered at a reference patch 220. The search is conducted in identical window position in multiple temporally adjacent frames. Similar patches are grouped to construct a block $\beta_p = B_p \phi$. Each block $\beta_p = B_p \phi \in \mathbb{R}^{B \times L}$ is obtained by first selecting the reference patch, and then finding L−1 similar patches within the current frame, as well as adjacent temporal frames.

To determine similarity and to group similar patches, we use the intensity measurements in the optical image as a guide. To reduce the computational complexity of the search, we restrict the search to a space-time window of fixed size around the reference patch 220. We perform the same block searching and grouping for all space-time frames by moving the reference patch, and by considering overlapping patches in each frame. Thus, each pixel in the measurements $\phi$ can contribute to multiple blocks.

The adjoint $B_p^T$ of $B_p$ corresponds to replacing the patches in the block at their original locations in the depth measurements $\phi$. The adjoint satisfies the following property $$\sum_{p=1}^{P} B_p^T B_p = R, \quad (3)$$

where $R = \operatorname{diag}(r_1, \ldots, r_N) \in \mathbb{R}^{NT \times NT}$ and $r_n$ denotes the total number of references to the $n^{th}$ pixel by the matrices $\{B_p\}_{p=1,\ldots,P}$. Therefore, the depth measurements $\phi$ can be expressed in terms of an overcomplete representation using the blocks $$\phi = R^{-1} \sum_{p=1}^{P} B_p^T B_p \phi. \quad (4)$$

Rank Regularization

Each block, represented as a matrix, contains multiple similar patches, i.e., similar columns. Thus, we expect the matrix to have a low rank, making rank a natural regularizer for the problem $$\mathcal{R}(\beta) = \operatorname{rank}(\beta) \cdot (\beta \in \mathbb{R}^{B \times L}). \quad (5)$$

By seeking a low-rank solution to (2), we exploit the similarity of corresponding blocks to guide superresolution while enforcing consistency with the sensed intensity measurements. However, the rank regularizer (5) is of little practical interest because its direct optimization is intractable. One approach around this is to convexify the rank by replacing it with the nuclear norm:

$$\mathcal{R}(\beta) = \lambda\|\beta\|_* \triangleq \lambda\Sigma_{k=1}^{\min(B,L)}\sigma_k(\beta), \quad (6)$$

where $\sigma_k(\beta)$ denotes the $k^{th}$ largest singular value of $\beta$, and $\lambda > 0$ is a parameter controlling the amount of regularization.

In addition to its convexity, the nuclear norm is an appealing penalty to optimize because the nuclear norm has a closed form proximal operator:

$$prox_{\lambda\|\cdot\|_*}(\psi) \triangleq \operatorname*{argmin}_{\beta \in \mathbb{R}^{B \times L}}\left\{\frac{1}{2}\|\psi - \beta\|_F^2 + \lambda\|\beta\|_*\right\} \quad (7)$$

$$= u\eta_\lambda(\sigma(\psi))v^T,$$

where $\psi = u\sigma v^T$ is a singular value decomposition (SVD) of $\psi$, and $\eta_\lambda$ is a soft-thresholding function applied to the diagonal matrix $\sigma$.

It is known that nonconvex regularizers consistently outperform nuclear norm by providing better denoising capability without losing important signal components. We use the following nonconvex generalization to the nuclear norm $$\mathcal{R}(\beta) = \lambda\mathcal{G}_{\lambda,v}(\beta) \triangleq \lambda\Sigma_{k=1}^{\min(B,L)}g_{\lambda,v}(\sigma_k(\beta)), \text{see e.g.,} \quad (8)$$

R. Chartrand, "Nonconvex splitting for regularized Low-Rank+Sparse decomposition. IEEE Trans. Signal Process., 60(11):5810-5819, November 2012.

The scalar function $g_{\lambda,v}$ is satisfies $$\min_{x \in \mathbb{R}}\left\{\frac{1}{2}|x-y|^2 + \lambda g_{\lambda,v}(x)\right\} = h_{\lambda,v}(x), \quad (9)$$

where $h_{\lambda,v}$ is the v-Huber function $$h_{\lambda,v}(x) \triangleq \begin{cases} \frac{|x|^2}{2\lambda} & \text{if } |x| < \lambda^{1/(2-v)} \\ \frac{|x|^v}{v} - \delta & \text{if } |x| \geq \lambda^{1/(2-v)} \end{cases}, \quad (10)$$

with $\delta \triangleq (1/v - 1/2)\lambda^{v/(2-v)}$.

Although $g_{\lambda,v}$ is nonconvex and has no closed form formula, its proximal operator does admit a closed form expression $$prox_{\lambda\mathcal{G}_{\lambda,v}}(\psi) \triangleq \operatorname*{argmin}_{\beta \in \mathbb{R}^{B \times L}}\left\{\frac{1}{2}\|\psi - \beta\|_F^2 + \lambda\mathcal{G}_{\lambda,v}(\beta)\right\} \quad (11)$$

$$= u\mathcal{T}_{\lambda,v}(\sigma(\psi))v^T,$$

where $\mathcal{T}_{\lambda,v}$ is a pointwise v-shrinkage operator defined as $$\mathcal{T}_{\lambda,v}(x) \triangleq \max(0, |x| - \lambda|x|^{v-1})\frac{x}{|x|}. \quad (12)$$

Figure 3:
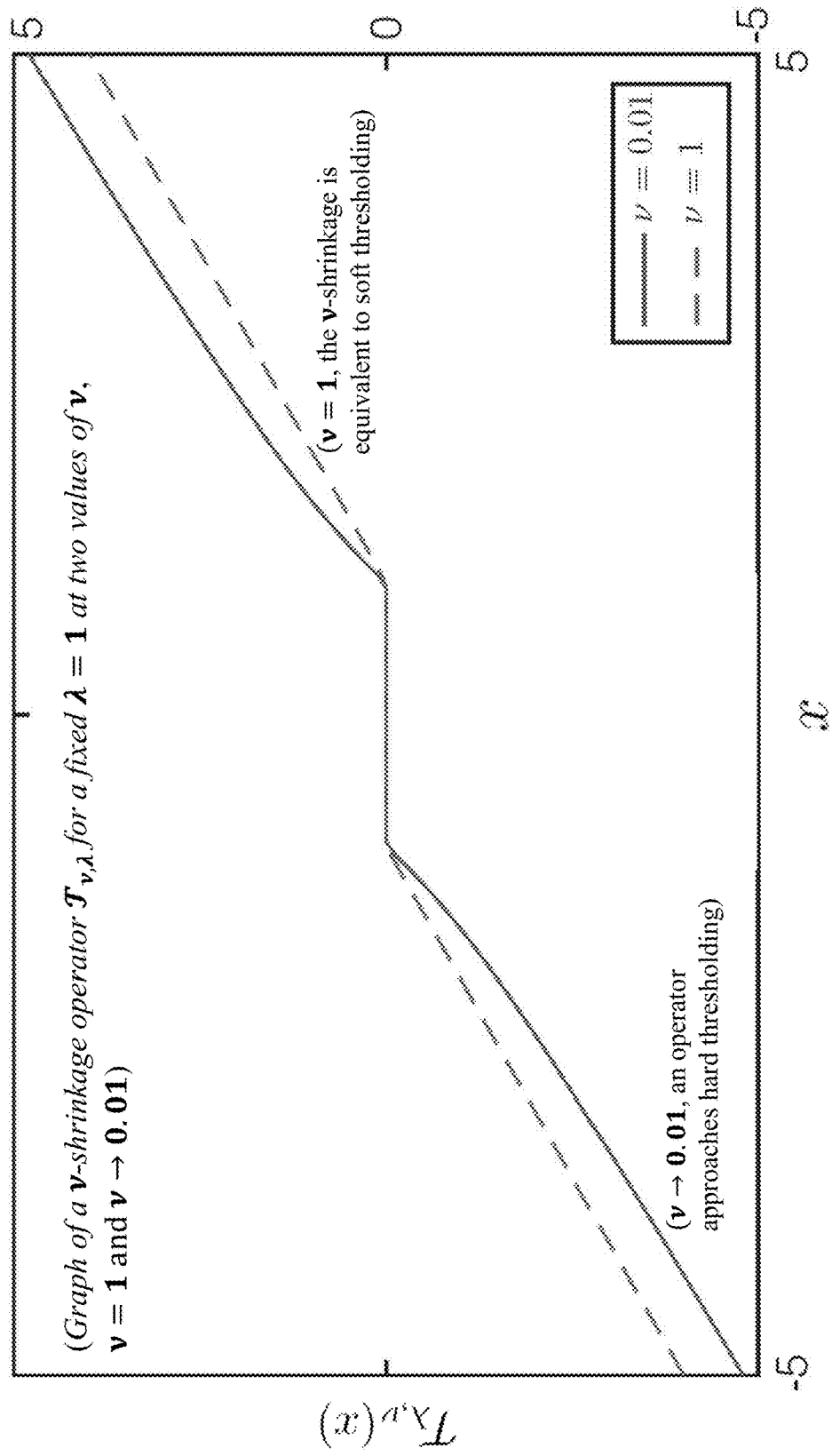
FIG. 3 is of the v-shrinkage operator according to embodiments of the invention.

FIG. 3 is a graph of the v-shrinkage operator $\mathcal{T}_{v,\lambda}$ for a fixed $\lambda = 1$ at two values of v. For $v = 1$, the v-shrinkage (12) is equivalent to conventional soft thresholding. When $v \to 0$, the operator approaches hard thresholding, which is similar to principal component analysis (PCA) in the sense that operator only retains the significant principal components.

Thus, the regularizer (8) is a computationally tractable alternative to the rank penalty. While the regularizer is not convex, it can still be efficiently optimized due to closed form of its proximal operator. Note that due to nonconvexity of our regularizer for $\eta < 1$, it is difficult to theoretically guarantee global convergence. However, we have empirically observed that our methods converge reliably over a broad spectrum of examples.

Iterative Optimization

To solve the optimization problem (2) using the rank regularizer (8), we simplify our notation by defining an operator $B \triangleq (B_1, \ldots, B_P)$, and a vector $\beta \triangleq B\phi = (\beta_1, \ldots, \beta_P)$.

The minimization is performed using an augmented-Lagrangian (AL) method. Specifically, we seek the critical points of the following AL $$\mathcal{L}(\phi, \beta, s) \triangleq \frac{1}{2}\|\psi - H\phi\|_{l_2}^2 + \sum_{p=1}^{P}\mathcal{R}(\beta_p) + \quad (13)$$

$$\frac{\rho}{2}\|\beta - B\phi\|_{l_2}^2 + s^T(\beta - B\phi)$$

$$= \frac{1}{2}\|\psi - H\phi\|_{l_2}^2 + \sum_{p=1}^{P}\mathcal{R}(\beta_p) + \quad (14)$$

$$\frac{\rho}{2}\|\beta - B\phi + s/\rho\|_{l_2}^2 - \frac{1}{2\rho}\|s\|_{l_2}^2,$$

where $\rho > 0$ is the quadratic parameter, and s is the dual variable that imposes the constraint $\beta = B\phi$.

Conventionally, the AL method solves (2) by alternating between a joint minimization step and an update step as $$(\phi^k, \beta^k) \leftarrow \operatorname*{argmin}_{\phi \in \mathbb{R}^{NT}, \beta \in \mathbb{R}^{P \times B \times L}}\{\mathcal{L}(\phi, \beta, s^{k-1})\} \quad (15)$$

$$s^k \leftarrow s^{k-1} + \rho(\beta^k - B\phi^k). \quad (16)$$

However, the joint minimization in (15) is typically computationally intensive. To reduce the complexity, we separate (15) into a succession of simpler steps using the alternating direction method of multipliers (ADMM)

The steps are as follows $$\phi^k \leftarrow \operatorname*{argmin}_{\phi \in \mathbb{R}^{NT}}\{\mathcal{L}(\phi, \beta^{k-1}, s^{k-1})\}, \quad (17)$$

$$\beta^k \leftarrow \operatorname*{argmin}_{\beta \in \mathbb{R}^{P \times B \times L}}\{\mathcal{L}(\phi^k, \beta, s^{k-1})\}, \text{ and} \quad (18)$$

$$s^k \leftarrow s^{k-1} + \rho(\beta^k - B\phi^k). \quad (19)$$

By ignoring the terms that do not depend on the depth measurements $\phi$, (17) amounts to solving a quadratic equation $$\phi^k \leftarrow \operatorname*{argmin}_{\phi \in \mathbb{R}^{NT}}\left\{\frac{1}{2}\|\psi - H\phi\|_{l_2}^2 + \frac{\rho}{2}\|B\phi - z^{k-1}\|_{l_2}^2\right\} \quad (20)$$

$$\leftarrow (H^T H + \rho B^T B)^{-1}(H\psi + \rho B^T z^{k-1}),$$

where $z^{k-1} \triangleq \beta^{k-1}+s^{k-1}/\rho$. Solving this quadratic equation is efficient because the inversion is performed on a diagonal matrix. Similarly, (18) is solved by $$\beta^k \leftarrow \underset{\beta \in \mathbb{R}^{P \times B \times L}}{\operatorname{argmin}} \left\{ \frac{\rho}{2}\|\beta - y^k\|_{l_2}^2 + \sum_{p=1}^P \mathcal{R}(\beta_p) \right\}, \quad (21)$$

with $y^k \triangleq B\phi^k - s^{k-1}/\rho$.

This step can be solved via block-wise application of a proximal operator as $$\beta_p^k \leftarrow \operatorname{prox}_{(\lambda/\rho)\mathcal{G}_{\lambda,\nu}}(B_p\phi^k - s_p^{k-1}/\rho), \quad (22)$$

for all $p \in [1, \ldots, P]$.

Simplified Method

The above iterative optimization method can be significantly simplified by decoupling the enforcement of the data-fidelity from the enforcement of the rank-based regularization. The simplified method reduces the computational complexity while making estimation more uniform across the entire space-time depth measurements.

Due to inhomogeneous distribution of pixel references generated by matching across the image, using a penalty with a single regularization parameter highly penalizes pixels with a large number of references. The resulting nonuniform regularization makes the method potentially oversensitive to the choice of the parameter λ. Instead, we rely on the simplified method $$\beta_p^k \leftarrow \underset{\beta_p \in \mathbb{R}^{B \times L}}{\operatorname{argmin}} \left\{ \frac{1}{2}\|\beta_p - B_p\phi^{k-1}\|_F^2 + \mathcal{R}(\beta_p) \right\} \quad (23)$$

$$\phi^k \leftarrow \underset{\phi \in \mathbb{R}^{NT}}{\operatorname{argmin}} \left\{ \frac{1}{2}\|\psi - H\phi\|_{l_2}^2 + \frac{\rho}{2}\|\phi - \tilde{\phi}^k\|_{l_2}^2 \right\} \quad (24)$$

where $\tilde{\phi}^k \triangleq R^{-1}B^T\beta^k$, and $\lambda > 0$ is the regularization and $\rho > 0$ is the quadratic parameters.

To solve (23) we apply the proximal operator $$\beta_p^k \leftarrow \operatorname{prox}_{\lambda\mathcal{G}_{\lambda,\nu}}(B_p\phi^{k-1}), \quad (25)$$

for all $p \in [1, \ldots, P]$. Next, (24) reduces to a linear step $$\phi^k \leftarrow (H^T H + \rho I)^{-1}(H^T\psi + \rho\tilde{\phi}^k). \quad (26)$$

There are substantial similarities between iterative optimization and simplified methods. The main differences are that we eliminated the dual variable s, and simplified the quadratic subproblem (20).

Effect of the Invention

The embodiments provide a novel motion-adaptive method and system for constructing superresolution of depth images. The method searches for similar patches from several frames, which are grouped into blocks that are then supperresolved using a rank regularizer. Using this approach, we can produce a high-resolution depth images from low-resolution depth measurements. Compared to the conventional techniques, the method preserves temporal edges in the solution and effectively mitigates noise in practical configurations.

While our method has a higher computational complexity than conventional approaches that process each frame individually, it allows us to incorporate a very effective regularization for stabilizing the inverse problem associated with superresolution. The method enables efficient computation and straightforward implementation by reducing the problem to a succession of straightforward operations. Results demonstrate the considerable benefits of incorporating time and motion adaptivity into inverse-problems for depth estimation.

Key contributes include providing a novel formulation for guided depth superresolution incorporating temporal information. In this formulation, the high resolution depth is determined by solving an inverse problem that minimizes a cost. This cost includes a quadratic data-fidelity term, as well as a motion adaptive regularizer based on a low-rank penalty on groups of similar patches.

Two optimization strategies are described for solving our estimation problem. The first approach is based on an exact optimization of the cost via alternating direction method of multipliers (ADMM). The second approach uses a simplified procedure that alternates between enforcing data-consistency and the low-rank penalty.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for fusing sensed measurements, comprising steps:
   acquiring depth measurements of a scene as a sequence of frames with a depth sensor;
   acquiring intensity measurements of the scene as a sequence of images with a camera, wherein a resolution of the depth sensor is less than a resolution of the camera, and further comprising computerized steps;
   searching for similar patches in multiple temporally adjacent frames of the depth measurements;
   grouping the similar patches into three-dimensional (3D) blocks using the intensity measurements;
   increasing a depth resolution of the three-dimensional (3D) blocks by performing a matrix completion of each 3D block using rank regularization to obtain increased resolution blocks, wherein the rank regularization is only enforced on the depth measurements of the patches;
   constructing a depth image with a resolution greater than the resolution of the depth sensor from the increased resolution blocks; and
   repeating the computerized steps until a termination condition is reached.

2. The method of claim 1, wherein the depth sensor and the camera are calibrated.

3. The method of claim 1, wherein the depth sensor is a light radar (LIDAR) sensor.

4. The method of claim 1, wherein the camera is a video camera.

5. The method of claim 1, wherein the rank regularization controls a similarity of the patches of images grouped in the same block.

6. The method of claim 5, wherein the rank regularization penalizes a rank of the block.

7. The method of claim 5, wherein the cost function is minimized using an augmented-Lagrangian method.

8. The method of claim 7, the augmented-Lagrangian uses an alternating direction method of multipliers.

9. The method of claim 1, wherein the depth image is motion adaptive by combining measurements from multiple views of the scene.

10. The method of claim 1, wherein the searching and grouping uses a search area centered at a reference patch, and by considering overlapping patches in each frame.

11. The method of claim 1, wherein the rank regularization uses a v-shrinkage operator.

12. The method of claim 1, wherein the increasing the resolution minimizes a cost function that combines a quadratic data-fidelity term.

13. The method of claim 1, wherein the rank regularization reduces the rank of the block.

14. The method of claim 1, wherein the rank regularization reduces a nuclear norm of the block.

15. The method of claim 1 wherein the rank regularization applies a soft-thresholding function.

16. The method of claim 1, wherein the rank regularization uses a nonconvex regularizer.

17. The method of claim 1, wherein the rank regularization uses an iterative optimization.

18. The method of claim 1, wherein the rank regularization enforces a data fidelity criterion.

19. The method of claim 18, wherein an enforcement of the data fidelity criterion is decoupled from an enforcement of the rank regularization.

20. The method of claim 18, wherein the rank regularization is nonuniform.

21. A system for fusing sensed measurements, comprising:
    a depth sensor to acquire depth measurements of a scene as a sequence of frames;
    a camera to acquire intensity measurements of the scene as a sequence of images, wherein a resolution of the depth sensor is less than a resolution of the camera; and
    a processor configured to search for similar patches in multiple temporally adjacent frames of the depth measurements, to group the similar patches into three-dimensional (3D) blocks using the intensity measurements, to increase a depth resolution of the three-dimensional (3D) blocks by performing a matrix completion of each 3D block using rank regularization to obtain increased resolution blocks, wherein the rank regularization is only enforced on the depth measurements of the patches; to construct a depth image with a resolution greater than the resolution of the depth sensor from the increased resolution blocks.

22. A system for fusing sensed measurements, comprising:
    a depth sensor to acquire depth measurements of a scene as a sequence of frames;
    a camera to acquire intensity measurements of the scene as a sequence of images, wherein a resolution of the depth sensor is less than a resolution of the camera; and
    a processor configured to search for similar patches in multiple temporally adjacent frames of the depth measurements, to group the similar patches into three-dimensional (3D) blocks using the intensity measurements, to increase a depth resolution of the three-dimensional (3D) blocks by performing a matrix completion of each 3D block using rank regularization to obtain increased resolution blocks, to construct a depth image with a resolution greater than the resolution of the depth sensor from the increased resolution blocks, until a termination condition is reached, wherein the rank regularization is only enforced on the depth measurements of the patches.

23. The method of claim 22, wherein the rank regularization controls a similarity of the patches of images grouped in the same block and penalizes a rank of the block, and cost function is minimized using an augmented-Lagrangian method, such that the augmented-Lagrangian uses an alternating direction method of multipliers.

24. A method for fusing sensed measurements, comprising steps:
    acquiring depth measurements of a scene as a sequence of frames with a depth sensor;
    acquiring corresponding intensity measurements of the scene as a sequence of images with a camera, wherein a resolution of the depth sensor is less than a resolution of the camera;
    searching for similar patches in multiple temporally adjacent frames of the intensity measurements;
    grouping patches of the depth measurements corresponding to the similar patches of the intensity measurements into three-dimensional (3D) blocks of the depth measurements;
    performing a matrix completion of each 3D block using rank regularization to obtain increased resolution blocks, wherein the rank regularization is only enforced on the depth measurements of the patches; and
    constructing a depth image with a resolution greater than the resolution of the depth sensor from the increased resolution blocks.

* * * * *